United States Patent

McNamee

[15] 3,646,366

[45] Feb. 29, 1972

[54] CIRCUIT FOR PERIODICALLY REVERSING THE POLARITY OF A DIRECT CURRENT POTENTIAL SUPPLY LINE

[72] Inventor: James W. McNamee, Warren, Ohio

[73] Assignee: General Motors Corporation, Detroit, Mich.

[22] Filed: Nov. 23, 1970

[21] Appl. No.: 92,026

[52] U.S. Cl. ....................... 307/252 W, 307/246, 307/252 J, 307/305, 331/173

[51] Int. Cl. .................................... H03k 17/30, H03k 17/72

[58] Field of Search .................. 307/246, 252 J, 252 W, 305, 307/284; 315/209 CD, 209 SC; 331/54, 55, 111, 117 R, 172, 173

[56] References Cited

UNITED STATES PATENTS

| | | | |
|---|---|---|---|
| 3,331,031 | 7/1967 | Nawracaj et al. | 331/173 X |
| 3,404,293 | 10/1968 | Harris et al | 307/252 J |
| 3,444,398 | 5/1969 | Brockway | 307/252 J X |
| 3,544,818 | 12/1970 | Harris | 307/252 J X |
| 3,244,790 | 4/1966 | Sharp | 307/246 X |

*Primary Examiner*—Donald D. Forrer
*Assistant Examiner*—L. N. Anagnos
*Attorney*—Eugene W. Christen, Creighton R. Meland and Richard G. Stahr

[57] ABSTRACT

A circuit for periodically reversing the polarity of a direct current potential supply line. An inductor element is connected in series between the positive polarity output terminal of a direct current potential source and the supply line and the anode-cathode electrodes of a silicon controlled rectifier are connected across the series combination of a capacitor which is charged to a predetermined potential magnitude of a polarity in series aiding relationship with the direct current potential source, the inductor element and the direct current potential source. When the capacitor has been charged to the predetermined potential magnitude, the silicon controlled rectifier is triggered conductive through the anode-cathode electrodes to complete a discharge circuit for the capacitor through the direct current potential source and the inductor element. The potential drop across the inductor element produced by the capacitor discharge current reverses the polarity of the supply line with respect to the negative polarity terminal of the direct current potential source.

6 Claims, 2 Drawing Figures

Figure 1:
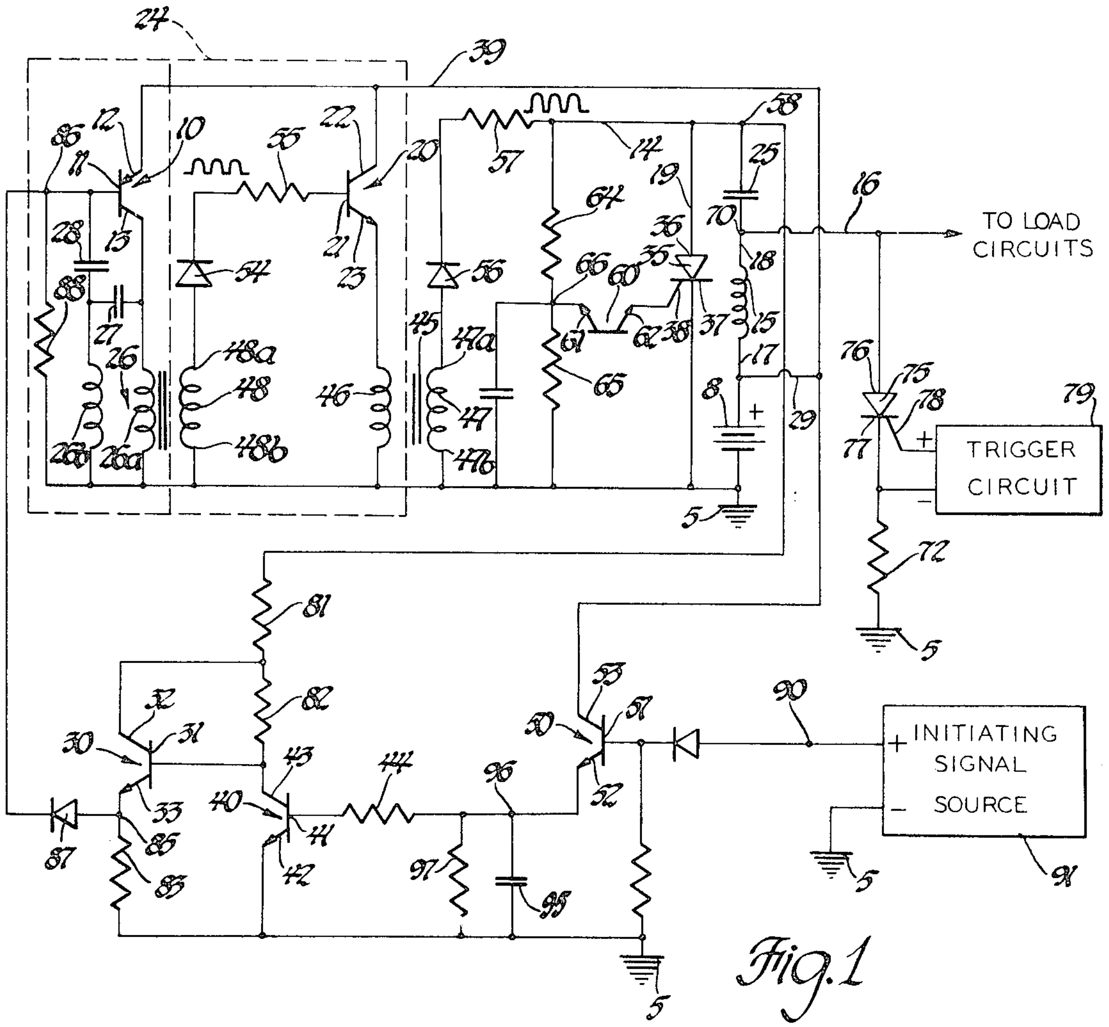

INVENTOR.
James W. McNamee
BY
Richard G. Stahr
ATTORNEY

CIRCUIT FOR PERIODICALLY REVERSING THE POLARITY OF A DIRECT CURRENT POTENTIAL SUPPLY LINE

This invention is directed to a circuit for periodically reversing the polarity of a direct current potential supply line connected to a selected polarity output terminal of a direct current potential source with respect to the other polarity output terminal and, more specifically, to a free-running blocking-type oscillator circuit which periodically discharges a capacitor through the direct current potential source and an inductor element connected in series between a selected polarity output terminal thereof and the supply line to produce a potential drop across the inductor element which reverses the polarity of the supply line with respect to the other polarity output terminal.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered to conduction upon the application, across the control-cathode electrodes, of a control potential signal of a polarity which is positive upon the control electrode with respect to the cathode electrode and of sufficient magnitude to produce control electrode-cathode, or gate, current. Upon being triggered to conduction, however, the control electrode is no longer capable of affecting the device which will remain in the conducting state until the anode-cathode current is reduced to a magnitude which is less than the rated holding current of the device for a period of 10 to 75 microseconds, depending upon the characteristics of the device. To reduce the anode-cathode electrode current flow through a silicon controlled rectifier to a magnitude less than the rated holding current of the device, the anode-cathode circuit may be interrupted for the period of time necessary to extinguish the device or the polarity of the potential applied across the anode-cathode electrodes may be reversed, cathode positive and anode negative, for the period of time necessary to extinguish the device by discharging a capacitor in a reverse polarity relationship across the anode-cathode electrodes. In alternating current circuits, the silicon controlled rectifier is automatically extinguished over each half-cycle of the alternating current supply potential during which the potential upon the cathode electrode is of a positive polarity with respect to the potential upon the anode electrode. With direct current circuits, however, prior art methods for extinguishing silicon controlled rectifiers are by interrupting the anode-cathode circuit or by discharging a capacitor in a reverse polarity relationship across the anode-cathode electrodes which requires a capacitor for each silicon controlled rectifier device, a circuit for placing a charge upon the capacitor in the proper polarity relationship and a switching device for completing a discharge circuit for each capacitor.

It is, therefore, an object of this invention to provide an improved circuit arrangement for extinguishing silicon controlled rectifiers connected across a direct current potential source.

It is another object of this invention to provide a circuit for periodically reversing the polarity of a direct current potential supply line connected to a selected polarity output terminal of a direct current potential source for extinguishing all silicon controlled rectifiers connected thereacross.

It is another object of this invention to provide a circuit for periodically reversing the polarity of a direct current potential supply line connected to a selected polarity output terminal of a direct current potential source using only a single capacitor for extinguishing all silicon controlled rectifiers connected thereacross.

In accordance with this invention, a circuit for periodically reversing the polarity of a direct current potential supply line is provided wherein an inductor element is connected in series between a selected polarity output terminal of a direct current potential source and the supply line and the anode-cathode electrodes of a silicon controlled rectifier are connected across the series combination of a capacitor charged from a half-wave rectified direct current potential source, the inductor element and the direct current potential source which is triggered conductive through the anode-cathode electrodes thereof to complete a discharge circuit for the capacitor through the direct current potential source and the inductor element when the charge upon the capacitor has reached a predetermined magnitude, the potential drop across the inductor element reversing the polarity of the supply line with respect to the other output terminal of the direct current potential source.

Figure 2:
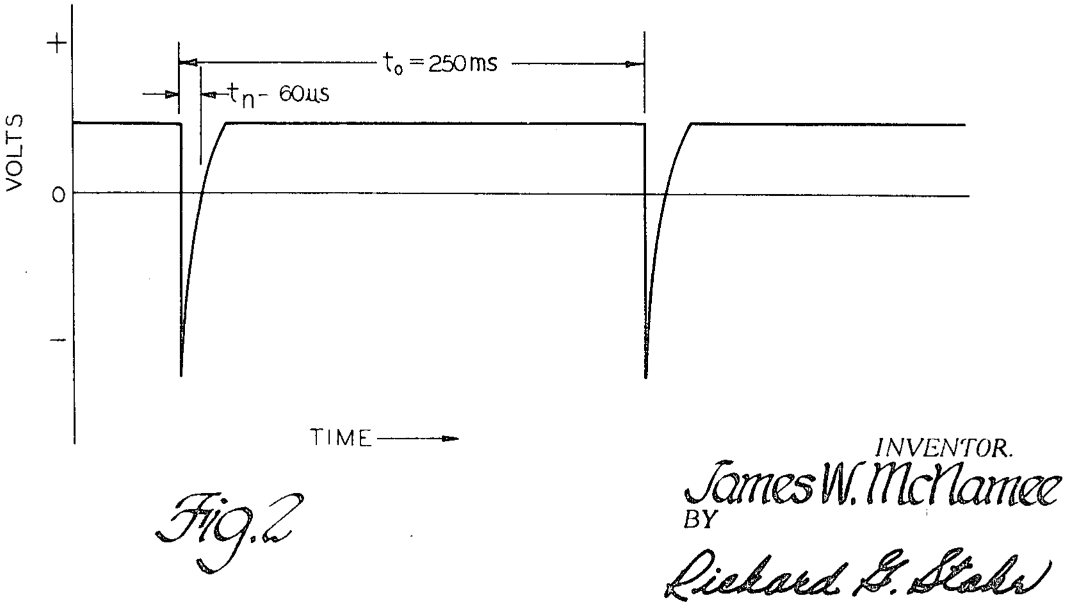

For a better understanding of the present invention, together with additional objects, advantages and features thereof, reference is made to the following description and accompanying drawings in which:

FIG. 1 is a schematic diagram of the circuit of this invention for periodically reversing the polarity of a direct current potential supply line, and FIG. 2 is a curve useful in understanding the circuit of FIG. 1.

As the point of reference or ground potential is the same point electrically throughout the circuit, it has been represented by the accepted schematic symbol and referenced by the numeral 5.

Referring to FIG. 1 of the drawings, the circuit of this invention for periodically reversing the polarity of a direct current potential supply line is set forth in schematic form in combination with a direct current potential source having positive and negative polarity output terminals, may be a conventional storage battery 8, an inductor element 15, a nonpolarized capacitor 25 and an electrical switching device, which may be a silicon controlled rectifier 35 having an anode electrode 36, a cathode electrode 37, and a gate electrode 38, for completing a discharge circuit for nonpolarized capacitor 25 through the direct current potential source 8 and the inductor element 15 when the charge upon the capacitor 25 reaches a predetermined potential magnitude.

Although the direct current potential source is illustrated in FIG. 1 as a conventional storage battery 8, it is to be specifically understood that the circuit of this invention is equally adaptable for use with any other type direct current potential source.

Inductor element 15 is connected in series between a selected polarity output terminal of the direct current potential source and direct current potential supply line 16. In FIG. 1 and without intention or inference of a limitation thereto, inductor element 15 is connected in series between the positive polarity output terminal of battery 8 and direct current potential supply line 16 through respective leads 17 and 18.

In a manner to be explained in detail later in this specification, the potential drop across an inductor element produced by the discharge current of a capacitor reverses the polarity of a direct current potential supply line connected to a selected polarity output terminal of a direct current potential source with respect to the other polarity output terminal. Therefore, it is necessary that the inductor element have a high-inductive impedance to alternating current and, since it is connected in series between a selected polarity output terminal of the direct current potential source and the direct current potential supply line, a very low ohmic value or direct current resistance to prevent an appreciable reduction of direct current supply potential across the supply line and the other polarity output terminal of the direct current potential source. In a practical application of the circuit of this invention, inductor element 15 was a 10-foot length of AWG No. 10 ferrite-coated copper wire.

The nonpolarized capacitor is connected across the inductor element and direct current potential source in series. In FIG. 1 capacitor 25 is connected across inductor element 15 and battery 8 in series through lead 14, lead 19, the anode-cathode electrodes of silicon controlled rectifier 35 and point of reference or ground potential 5. The anode-cathode electrodes of silicon controlled rectifier 35, therefore, are connected across the series combination of capacitor 25, inductor element 15 and direct current potential source 8 for completing a discharge circuit for capacitor 25 through direct current potential source 8 and inductor element 15 when the charge upon capacitor 25 has reached a predetermined magnitude.

To charge capacitor 25 to a predetermined potential magnitude of a polarity in series aiding relationship with the direct current potential source, a source of direct current charging potential is provided. For reasons which will become apparent later in this specification, a source of half wave rectified direct current charging potential is the most desirable. To produce the necessary alternating current potential which may be half wave rectified to provide a half wave rectified direct current charging potential, any conventional, free-running oscillator circuit of the many types well known in the art may be employed without departing from the spirit of the invention. For purposes of this specification and without intention or inference of a limitation thereto, a conventional shunt fed Hartley type oscillator circuit is set forth within dashed rectangle 24. This oscillator circuit includes a split inductor 26 connected at its midpoint to a point of reference or ground potential 5, a type PNP-oscillator transistor 10 having a base electrode 11 and two current carrying electrodes, emitter electrode 12 and collector electrode 13 connected in the proper polarity relationship for a type PNP transistor across direct current potential source 8 through leads 29 and 39 and half 26*a* of split inductor 26 and through point of reference or ground potential 5, respectively, and capacitors 27 and 28 wherein capacitor 27 determines the frequency of oscillation and capacitor 28 supplies the positive feedback to base electrode 11 of oscillator transistor 10 from half 26*b* of split inductor 26.

If necessary or desirable, the output signals of the oscillator circuit may be transformer coupled to a conventional type NPN-amplifying transistor 20 having a base electrode 21, and two current carrying electrodes, collector electrode 22 and emitter electrode 23, connected in the proper polarity relationship for a type NPN-transistor across direct current potential source 8 through leads 29 and 39 and primary winding 46 of coupling transformer 45 and through point of reference or ground potential 5, respectively. The output signals of the oscillator circuit induce an alternating current potential in winding 48, magnetically coupled to inductor half 26*a*, and are applied across the base-emitter electrodes of type NPN amplifying transistor 20 through diode 54, which half wave rectifies the alternating current potential signals induced in winding 48, and current limiting resistor 55 and through point of reference or ground potential 5, respectively, in the proper polarity relationship to produce base-emitter and, consequently, collector-emitter current flow through a type NPN transistor. The output of the amplifier circuit may be transformer coupled to a charging circuit for capacitor 25 which may be traced from terminal end 47*a* of secondary winding 47 of coupling transformer 45, through diode 56, resistor 57, lead 14, junction 58, capacitor 25, inductor element 15, through battery 8 from the positive polarity terminal to the negative polarity terminal and point of reference or ground potential 5 to terminal end 47*b* of secondary winding 47 of coupling transformer 45. In a manner well known in the art, the collector-emitter current flow through type NPN-transistor 20 and primary winding 46 of coupling transformer 45 over those half cycles of the oscillator output signals during which terminal end 48*a* of winding 48 is of a positive polarity with respect to terminal end 48*b* induces a potential in secondary winding 47 of coupling transformer 45. Diode 56 isolates the flyback voltage of secondary winding 47 from the charging circuit and resistor 57 provides an impedance which prevents the short circuiting of secondary winding 47 while silicon controlled rectifier 35 is conducting.

Resistors 64 and 65 are connected in series across the series combination of capacitor 25, inductor element 15 and direct current potential source 8 through lead 14 and point of reference or ground potential 5.

The gate electrode 38 of silicon controlled rectifier 35 is connected to the junction 66 between resistors 64 and 65 through a potential sensitive bilateral electrical switching device 60.

A potential sensitive bilateral electrical switching device suitable for use with the circuit of this invention is a solid state device of the type which is normally not conductive but will become conductive through the current carrying elements 61 and 62 thereof when the potential applied thereacross exceeds the rated breakdown potential of the selected device which is commercially available from the General Electric Company.

As capacitor 25 is discharged when it has become charged to the predetermined potential magnitude, resistors 64 and 65 are so proportioned that, when capacitor 25 has become charged to the predetermined potential magnitude, the potential appearing across junction 66 and point of reference or ground potential 5 is of a positive polarity and of a magnitude equal to the breakdown potential of the device selected as bilateral switch 60, to produce conduction through this device to complete a circuit for the flow of gate-cathode current through silicon controlled rectifier 35.

The output signal produced by oscillator circuit 24 induces an alternating current potential in winding 48 which is half wave rectified by diode 54 and amplified by transistor 20 in a manner well known in the art. The amplified half wave rectified direct current signal appears across primary winding 46 of coupling transformer 45 and induces half wave rectified direct current charging potential in secondary winding 47 which charges capacitor 25 through a circuit which may be traced from the terminal end 47*a* of secondary winding 47, through diode 56, resistor 57, lead 14, capacitor 25, inductor element 15, battery 8 from the positive polarity terminal to the negative polarity terminal and point of reference or ground potential 5 to the opposite terminal end 47*b* of secondary winding 47. When capacitor 25 has been charged to the preselected potential magnitude, for example, 100 volts in a practical application of the circuit of this invention, the potential appearing across junction 66 and point of reference or ground potential 5 is of a sufficient magnitude to break down bilateral switching device 60, for example 32 volts. Conducting bilateral switching device 60 completes a circuit of the flow of gate-cathode current through silicon controlled rectifier 35 which may be traced from junction 66, through bilateral switching device 60, the gate-cathode electrodes of silicon controlled rectifier 35 to point of reference or ground potential 5 to trigger silicon controlled rectifier 35 conductive through the anode-cathode electrodes.

Conducting silicon controlled rectifier 35 completes a discharge circuit for capacitor 25 which may be traced from the plate of capacitor 25 connected to junction 58, through the anode-cathode electrodes of silicon controlled rectifier 35, point of reference or ground potential 5, through battery 8 in a direction from the negative polarity terminal to the positive polarity terminal and inductor element 15 to the opposite plate of capacitor 25.

For purposes of specification, this discharge circuit loop may be divided into three impedances, the impedance of the wire leads which connect the plate of capacitor 25 connected to junction 58 to the anode electrode of silicon controlled rectifier 35 plus the impedance of silicon controlled rectifier 35 plus the impedance of the lead connecting the cathode of electrode of silicon controlled rectifier 35 to point of reference or ground potential 5 and the impedance of the ground point, hereinafter referred to as impedance Z1, the impedance of battery 8 and the impedance of inductor element 15. For purposes of illustration only and without intent or inference of limitation thereto, it will be assumed that capacitor 25 is charged to a direct current potential magnitude of 100 volts and that battery 8 is a 12-volt source. Since the charge on capacitor 25 is in series aiding relationship with battery 8, the potential across junction 58 and point of reference or ground potential 5 is 112 volts. In accordance with Kirchoff's second EMF law, the sum of the voltage drops around any closed loop of a network equals the sum of the voltage rises around this loop. Further, for purposes of explanation only and without intent or inference of a limitation thereto, it will be assumed that one-fourth of the voltage appearing across junction 58 and point of reference or ground potential 5 is dropped across impedance Z1, that one-fourth of this voltage is dropped across battery 8 and one-half of this voltage is dropped across inductor element 15. That is, 28 volts is dropped across impedance Z1, 28 volts is dropped across the impedance of battery 8 and 56 volts is dropped across the impedance of inductor element 15. Going around this loop from reference point junction 70 to which direct current potential supply line 16 is connected, there is a potential rise of 100 volts through capacitor 25, a potential drop of 28 volts across impedance Z1 for a net of 72 volts, a potential drop of 28 volts across the impedance of battery 8 which reduces the potential to 44 volts plus a potential rise of 12 volts through battery 8 of 12 volts which raises the potential to 56 volts and a potential drop across inductor element 15 of 56 volts or zero volts at junction 70. Consequently, during the discharge of capacitor 25, the potential of direct current potential supply line 16, connected through inductor element 15 to the positive polarity output terminal of battery 8 is 72 volts more negative than the other or negative polarity output terminal of battery 8 connected to point of reference or ground potential 5.

When capacitor 25 has become discharged, discharge current ceases to flow through the anode-cathode electrodes of silicon controlled rectifier 35. Consequently, when the half wave rectified direct current charging potential falls to zero, the flow of current through the anode-cathode electrodes of silicon controlled rectifier 35 falls to zero for a period of time long enough to extinguish silicon controlled rectifier 35. It is for this reason that a source of half wave rectified charging potential is the most desirable for the circuit of this invention.

With silicon controlled rectifier 35 extinguished, capacitor 25 again charges through the circuit previously described. When capacitor 25 has become charged to the predetermined direct current potential magnitude, bilateral switching device 60 is again triggered conductive to complete the circuit for gate-cathode current flow through silicon controlled rectifier 35 to trigger this device conductive through the anode-cathode electrodes to complete the discharge circuit for capacitor 25 previously described. When capacitor 25 has again become discharged, silicon controlled rectifier 35 extinguishes and the cycle hereinabove described continues so long as a direct current charging potential is supplied.

Consequently, the circuit of this invention operates as a free-running blocking-type oscillating circuit which oscillates so long as charging potential is supplied to capacitor 25 to reverse the polarity of the direct current potential supply line connected to a selected polarity output terminal of the direct current potential source with respect to the other polarity output terminal of the direct current potential source for the duration of each discharge of capacitor 25.

The time required for capacitor 25 to become charged to the predetermined direct current potential magnitude is determined by the time constant of the charging circuit previously described and the time required for the discharge of capacitor 25 is, of course, determined by the time constant of the discharge circuit previously described. Consequently, the frequency of the circuit of this invention is determined by the time constant of the charging circuit and the length of time during which the polarity of the direct current potential supply line connected to a selected polarity terminal of the direct current potential source is reversed with respect to the other polarity terminal of the direct current potential source is determined by the time constant of the discharge circuit. In a practical application of the circuit of this invention, the time required for capacitor 25 to be charged to the predetermined direct current potential magnitude was of the order of 250 milliseconds and the time required for the discharge of capacitor 25 was of the order of 60 microseconds. The circuit of this invention, therefore, periodically reverses the polarity of the direct current supply potential line connected to a selected polarity terminal of a direct current potential source with respect to the other polarity terminal of the direct current potential source at a repetitive rate determined by the time constant of the charging circuit for a duration of time determined by the time constant of the capacitor discharge circuit as shown by the curve of FIG. 2.

For purposes of illustration, an electrical load represented in FIG. 1 as a resistor element 72 is connected across the direct current potential supply line 16 and point of reference or ground potential 5 through the anode electrode 76 and cathode electrode 77 of a switching silicon controlled rectifier 75. Although the electrical load is represented as a resistor, it is to be specifically understood that this load may be an electric lamp, an electric motor, a radio or any other conventional electric load. Connected across the gate electrode 78 and cathode electrode 77 of switching silicon controlled rectifier 75 is a trigger circuit 79 which, since it may be any one of several silicon controlled rectifier trigger circuits well known in the art, and per se forms no part of this invention, has been illustrated in block form. Upon demand, trigger circuit 79 supplies a trigger signal across the gate-cathode electrodes of switching silicon controlled rectifier 75 of a positive polarity upon gate electrode 78 with respect to cathode electrode 77 which is maintained so long as it is desired that electrical load 72 be energized. Upon each reversal of the polarity of direct current potential supply line 16 during the discharge of capacitor 25, the potential applied across the anode-cathode electrodes of switching silicon controlled rectifier 75 is of an inverse polarity relationship which interrupts the flow of anode-cathode current therethrough for a period of time long enough to extinguish this device. So long as the signal supplied by trigger circuit 79 is maintained, switching silicon controlled rectifier 75 is again triggered conductive through the anode-cathode electrodes thereof to reestablish the energizing circuit for electrical load 72 when the potential of direct current supply line 16 returns to normal at the conclusion of each discharge of capacitor 25. As switching silicon controlled rectifier 75 is extinguished for an extremely short period of time, of the order of 60 microseconds, the electrical inertia of electrical load 72 prevents a noticeable interruption of the energizing circuit therefor. When it is desired to deenergize electrical load 72, the signal supplied by trigger circuit 79 is removed from across the gate-cathode electrodes of switching silicon controlled rectifier 75. Consequently, the next time switching silicon controlled rectifier 75 is extinguished, it is not retriggered conductive when the potential of direct current potential supply line 16 returns to normal.

Although in FIG. 1 only one electrical load is shown to be connected across direct current potential supply line 16 and point of reference or ground potential 5 through the anode-cathode electrodes of switching silicon controlled rectifier, many electrical loads may be so connected thereacross. During the operation of the circuit of this invention, all of the conducting switching silicon controlled rectifiers will be extinguished by the discharge of capacitor 25. When the potential of direct current potential supply line 16 returns to normal, those switching silicon controlled rectifiers having a trigger signal maintained across the gate-cathode electrodes thereof will be again triggered conductive to complete the energizing circuit for each respective electrical load and those switching silicon controlled rectifiers which do not have a trigger signal across the gate-cathode electrodes thereof will remain extinguished to interrupt the energizing circuit for each respective electrical load.

Other electrical loads which are switched by switching devices other than a silicon controlled rectifier may also be connected across direct current supply line 16 and point of reference or ground potential 5. These devices are unaffected by the discharge of capacitor 25.

The circuit of this invention has been herein described with reference to a negative ground direct current potential system. It is to be specifically understood that this circuit is equally satisfactory for use with positive ground or ungrounded systems.

In the preferred embodiment, inductor element 15 is employed for the reason that the capacitance of capacitor 25 may be materially reduced. This circuit will also provide satisfactory operation with only the inductance of the lead between the battery and the supply line with a larger capacitor.

The source of direct current potential which supplies the charge upon capacitor 25 may be connected directly across capacitor 25, there being no intention or inference of a limitation to the precise charging circuit arrangement hereinabove described.

During those times while it is not necessary for the circuitry just described to be operating, it may be desirable to place the circuit in a standby condition, for the purpose of conserving power, which will permit the prompt functioning of this circuit upon demand. Connected across the plate of capacitor 25 connected to junction 58, which is of a positive polarity with respect to point of reference or ground potential 5, and point of reference or ground potential 5 is the series combination of resistors 81 and 82, the base-emitter electrodes of type NPN-transistor 30 and resistor 83. The voltage divider network comprising series resistors 81, 82 and 83 is adjusted in such a manner that, with a direct current potential charge upon capacitor 25 of a selected magnitude slightly less than the breakdown potential of bilateral switching device 60, current flows through the base electrode 31 and emitter electrode 33 of transistor 30, consequently, current flows through collector electrode 32 and emitter electrode 33 thereof. With transistor 30 conducting through the collector-emitter electrodes, the potential upon junction 85 is of a positive polarity with respect to junction 86, consequently, diode 87 is forward poled. The resulting flow of current through resistor 88 produces a potential upon junction 86 of a positive polarity with respect to point of reference or ground potential 5 of a magnitude sufficient to interrupt the flow of emitter-base current through oscillator transistor 10, consequently, oscillator transistor 10 is extinguished. With oscillator transistor 10 extinguished, oscillator circuit 24 is disabled and no additional charge is placed upon capacitor 25. Should the charge upon capacitor 25 leak away, collector-emitter conduction through transistor 30 reduces. This reduction of collector-emitter current through transistor 30 results in a potential upon junction 85 of a magnitude less positive than that upon junction 86 to reverse pole diode 87 which interrupts the flow of current therethrough. With the interruption of current flow through diode 87, the potential upon junction 86 goes to substantially ground, consequently, emitter-base current flows through oscillator transistor 10 to initiate emitter-collector flow through this device. With emitter-collector current flowing through oscillator transistor 10, the oscillator circuit is again operative to charge capacitor 25. When capacitor 25 has charged to a direct current potential of the selected magnitude slightly less than the breakdown potential of bilateral switching device 60, the potential upon junction 85 again becomes more positive than the potential upon junction 86 to forward bias diode 87. With diode 87 forward biased, the current flow through resistor 88 produces a potential upon junction 86 of a positive polarity with respect to point of reference or ground potential 5 of a magnitude sufficient to interrupt the flow of emitter-base current through oscillator transistor 10 to disable the oscillator circuit.

Upon demand, a positive polarity signal may be connected across input terminal 90 and point of reference or ground potential 5 from an external initiating signal source 91. This signal is applied across the base electrode 51 and emitter electrode 52 of type NPN-transistor 50 in the proper polarity relationship to produce base-emitter current flow through a type NPN transistor. Consequently, as the collector electrode 53 thereof is connected to the positive polarity output terminal of battery 8, this device conducts through the collector-emitter electrodes to complete a circuit for the flow of current through the base electrode 41 and emitter electrode 42 of type NPN-transistor 40 through a current limiting resistor 44. As the collector electrode 43 of type NPN-transistor 40 is connected through series resistors 82 and 81 to the plate of capacitor 25 connected to junction 58 which is of a positive polarity with respect to point of reference or ground potential 5, this flow of emitter-base current through type NPN transistor 40 initiates collector-emitter current flow therethrough to drain base current from transistor 30, a condition which extinguishes transistor 30. With transistor 30 extinguished, junction 85 is of substantially ground potential to reverse bias diode 87. With diode 87 reverse biased, oscillator circuit 24 is enabled as previously described to continuously produce an output signal which places a charge upon capacitor 25, as previously described.

Conducting transistor 50 places a charge upon capacitor 95 which is of a positive polarity upon junction 96 with respect to point of reference or ground potential 5. This potential upon capacitor 95 maintains transistor 40 conductive for a period of time after the initiating signal is removed from terminal 90 as determined by the value of resistor 97.

While specific electronic circuitry, transistor types, solid state switching devices and electrical polarities have been set forth in this specification, it is to be specifically understood that alternate electronic circuitry, transistor types and solid state switching devices possessing similar electrical characteristics and compatible electrical polarities may be substituted therefor without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A circuit for periodically reversing the polarity of a direct current supply line comprising in combination with a direct current potential source having positive and negative polarity output terminals, a nonpolarized capacitor, circuit means for connecting said capacitor across said positive and negative polarity output terminals of said direct current potential source, means for charging said capacitor to a predetermined potential magnitude of a polarity in series aiding relationship with said direct current potential source, and a potential sensitive electrical switching means included in said circuit means responsive to said charge upon said capacitor reaching said predetermined potential magnitude for completing a discharge circuit for said capacitor through said direct current potential source.

2. A circuit for periodically reversing the polarity of a direct current potential supply line comprising in combination with a direct current potential source having positive and negative polarity output terminals, an inductor element, means for connecting said inductor element in series between a selected polarity output terminal of said direct current potential source and said supply line, a nonpolarized capacitor, circuit means for connecting said capacitor across said inductor element and said direct current potential source in series, means for charging said capacitor to a predetermined potential magnitude of a polarity in series aiding relationship with said direct current potential source, and electrical switching means included in said circuit means for completing a discharge circuit for said capacitor through said direct current potential source and said inductor element when the charge upon said capacitor reaches said predetermined potential magnitude.

3. A circuit for periodically reversing the polarity of a direct current potential supply line comprising in combination with a direct current potential source having positive and negative polarity output terminals, an inductor element, means for connecting said inductor element in series between a selected polarity output terminal of said direct current potential source and said supply line, a nonpolarized capacitor, circuit means for connecting said capacitor across said inductor element and said direct current potential source in series, a source of direct current charging potential, means for connecting said source of direct current charging potential across said capacitor for charging said capacitor to a predetermined potential magnitude of a polarity in series aiding relationship with said direct current potential source, and electrical switching means included in said circuit means for completing a discharge circuit for said capacitor through said direct current potential source and said inductor element when said charge upon said capacitor reaches said predetermined potential magnitude.

4. A circuit for periodically reversing the polarity of a direct current potential supply line comprising in combination with a direct current potential source having positive and negative polarity output terminals, an inductor element, means for connecting said inductor element in series between a selected polarity output terminal of said direct current potential source and said supply line, a nonpolarized capacitor, a silicon controlled rectifier having anode, cathode and gate electrodes, means for connecting said anode-cathode electrodes of said silicon controlled rectifier across the series combination of said capacitor, said inductor element and said direct current potential source, a source of half wave rectified direct current charging potential, means for connecting said source of direct current charging potential across said capacitor for charging said capacitor to a predetermined potential magnitude of a polarity in series aiding relationship with said direct current potential source, and means responsive to said charge upon said capacitor reaching said predetermined potential magnitude for completing a circuit for the flow of gate-cathode current through said silicon controlled rectifier.

5. A circuit for periodically reversing the polarity of a direct current potential supply line comprising in combination with a direct current potential source having positive and negative polarity output terminals, an inductor element, means for connecting said inductor element in series between a selected polarity output terminal of said direct current potential source and said supply line, a nonpolarized capacitor, a silicon controlled rectifier having anode, cathode and gate electrodes, means for connecting said anode-cathode electrodes of said silicon controlled rectifier across said series combination of said capacitor, said inductor element and said direct current potential source, a source of half wave rectified direct current charging potential, means for connecting said source of direct current charging potential across said capacitor for charging said capacitor to a predetermined potential magnitude of a polarity in series aiding relationship with said direct current potential source, a bilateral potential sensitive electrical switching device, first and second resistors, means for connecting said first and second resistors in series across said series combination of said capacitor, said inductor and said direct current potential source, and means for connecting said gate electrode of said silicon controlled rectifier to the junction between said first and second resistors through said bilateral potential sensitive electrical switching device.

6. A circuit for periodically reversing the polarity of a direct current potential supply line comprising in combination with a battery having positive and negative polarity output terminals, an inductor element, means for connecting said inductor element in series between a selected polarity output terminal of said battery and said supply line, a nonpolarized capacitor, a silicon controlled rectifier having anode, cathode and gate electrodes, means for connecting said anode-cathode electrodes of said silicon controlled rectifier across the series combination of said capacitor, said inductor element and said battery, a source of half wave rectified direct current charging potential, means for connecting said source of direct current charging potential across the series combination of said capacitor, said inductor element and said battery for charging said capacitor to a predetermined potential magnitude of a polarity in series aiding relationship with said battery, a bilateral potential sensitive electrical switching device, first and second resistors, means for connecting said first and second resistors in series across said series combination of said capacitor, said inductor element and said battery, and means for connecting said gate electrode of said silicon controlled rectifier to the junction between said first and second resistors through said bilateral potential sensitive electrical switching device.

* * * * *